(12) United States Patent
Tomiyama (10) Patent No.: US 7,980,370 B2
(45) Date of Patent: Jul. 19, 2011

(54) LOCKUP DEVICE AND HYDRAULIC TORQUE TRANSMISSION DEVICE PROVIDED WITH THE SAME

(75) Inventor: Naoki Tomiyama, Neyagawa (JP)

(73) Assignee: EXEDY Corporation, Neyagawa-shi (JP)

( * ) Notice: Subject to any disclaimer, the term of this patent is extended or adjusted under 35 U.S.C. 154(b) by 810 days.

(21) Appl. No.: 12/014,629

(22) Filed: Jan. 15, 2008

(65) Prior Publication Data

US 2009/0011902 A1    Jan. 8, 2009

(30) Foreign Application Priority Data

Feb. 16, 2007    (JP) .................................. 2007-036185

(51) Int. Cl.
*F16H 45/02*    (2006.01)
(52) U.S. Cl. .................. 192/3.29; 192/113.35
(58) Field of Classification Search .................. 192/3.29
See application file for complete search history.

(56) References Cited

U.S. PATENT DOCUMENTS 5,732,804 A * 3/1998 Wienholt ..................... 192/3.29
6,742,638 B2 * 6/2004 Maienschein et al. ....... 192/3.29

FOREIGN PATENT DOCUMENTS

JP    07-145858 A    6/1995
JP    H10-047453 A    2/1998

OTHER PUBLICATIONS

German Office Action of the corresponding German application No. 10 2008 008 864.1-12, dated Oct. 27, 2010.

* cited by examiner

*Primary Examiner* — Rodney H Bonck
(74) *Attorney, Agent, or Firm* — Global IP Counselors, LLP (57) ABSTRACT

A lockup device 7 of a torque converter 1 is formed of a piston 75, a clutch plate 80, and a damper mechanism 9. The clutch plate 80 has a first passage P1 connecting an inner space S3 on the radially inner side to a space S1 formed axially between the front cover 11 and the clutch plate 80, and a second passage P2 connecting the inner space S3 formed on the radially inner side to a space S2 formed axially between the piston and the clutch plate 80.

20 Claims, 6 Drawing Sheets

# LOCKUP DEVICE AND HYDRAULIC TORQUE TRANSMISSION DEVICE PROVIDED WITH THE SAME

CROSS-REFERENCE TO RELATED APPLICATIONS

This application claims priority to Japanese Patent Application No. 2007-36185 filed on Feb. 16, 2007. The entire disclosure of Japanese Patent Application No. 2007-36185 is hereby incorporated herein by reference.

BACKGROUND OF THE INVENTION

1. Field of the Invention

The present invention relates to a lockup device of a hydraulic torque transmission device, and particularly to a lockup device having a plurality of friction surfaces.

2. Background Information

A torque converter has been known as a hydraulic torque transmission device. A torque converter generally has three kinds of internal vane wheels (an impeller, a turbine, and a stator) for transmitting torque via an internal working fluid. The torque converter is provided with a lockup device in many cases.

The lockup device is arranged in a fluid chamber formed by a turbine and a front cover, and particularly in a space between the turbine and the front cover, and is a mechanism for directly transmitting the torque from the front cover to the turbine by mechanically coupling the front cover to the turbine.

Generally, the lockup device is formed of a circular plate-like or disk-like piston that can be pressed against the front cover, a friction plate to be held between the piston and the front cover, and a damper mechanism that can elastically couple the front cover to the turbine in a rotating direction via the friction plate, e.g., Japanese Laid-Open Patent Publication H10-47453.

When the lockup device is in an engaged state, hydraulic pressure moves the piston toward the front cover to hold the friction plate between the piston and the front cover. Consequently, the torque is transmitted from front cover to the friction plate, and further, is transmitted to the turbine via the damper mechanism.

When the lockup device is in a disengaged state, the hydraulic pressure moves the piston toward the turbine to allow the friction plate to rotate relatively to the front cover and the piston. Consequently, the torque is transmitted from the impeller to the turbine via the fluid without passing through the lockup device.

However, a drag torque may occur during the disengaged state of the lockup device. More specifically, when it is in the disengaged state, the fluid flows radially outward through a space between the friction plate and the front cover or between the friction plate and the piston. Thereby, the friction plate is pulled toward the front cover or the piston. Consequently, a slide resistance occurs between the friction plate and the front cover or between the front cover and the piston in spite of the fact that the device is in the disengaged state, and this slide resistance causes the drag torque.

In view of the above, it will be apparent to those skilled in the art from this disclosure that there exists a need for an improved lockup device and hydraulic torque transmission with the lockup device. This invention addresses this need in the art as well as other needs, which will become apparent to those skilled in the art from this disclosure.

SUMMARY OF THE INVENTION

An object of the invention is to reduce the drag torque in the lockup device of the hydraulic torque transmission device.

A lockup device according to a first aspect of the present invention is employed in a hydraulic torque transmission device having a front cover supplied with a torque, an impeller fixed to the front cover and forming a fluid chamber filled with a working fluid, and a turbine opposed to the impeller. The lockup device is arranged in a space between the front cover and the turbine to couple mechanically the front cover to the turbine. The lockup device includes a piston, a clutch member, and a damper mechanism. The piston is arranged rotatably and axially movably with respect to the turbine, and is axially movable according to a pressure of the working fluid. The clutch member has a frictional coupling portion arranged axially between the piston and the front cover for frictional engagement with the piston and the front cover. The damper mechanism elastically couples the clutch member and the turbine together in a rotating direction. The clutch member has a first passage formed internally and connecting a space on a radially inner side to a space formed axially between the front cover and the frictional coupling portion, and a second passage formed internally and connecting the space on the radially inner side to a space formed axially between the piston and the frictional coupling portion.

In this lockup device, when the piston moves toward the front cover according to changes in hydraulic pressure, the frictional coupling portion of the clutch member is held between the piston and the front cover. Thereby, the lockup device enters the engaged state to transmit the torque from the front cover to the turbine via the clutch member and the damper mechanism.

When the piston moves toward the turbine according to changes in hydraulic pressure, the clutch member becomes rotatable between the front cover and the piston, and the lockup device is disengaged.

In this case, the working fluid on a radially inner side of the clutch member is led by the first passage into a space formed axially between the front cover and the frictional coupling portion, and is also led by the second passage into a space formed axially between the piston and the frictional coupling portion. This can suppress such a state that the first plate is pulled toward the front cover or the second plate is pulled toward the piston. Therefore, the lockup device can reduce a drag torque.

The clutch member may be formed of an integrally formed member or a plurality of members.

A part of the first passage and a part of the second passage may share a passage. It is merely required that the first and second passages are formed when the lockup device is disengaged, and the parts of the passages may not be present during the engaged state.

The lockup device according to a second aspect of the present invention is the device of the first aspect, wherein the clutch member has a first plate for friction engagement with the front cover, and a second plate arranged axially between the first plate and the piston for frictional engagement with the piston. Radially outer portions of the first and second plates are fixed together to allow the working fluid to flow to a radially inner side into a space between the first and second plates. The first plate has a plurality of third passages extending axially and included in the first passage. The second plate has a plurality of fourth passages extending axially and included in the second passage.

In the description, the wordings "radially outer portions of the first and second plates" mean a radially outer portion of a first plate portion to be frictionally engaged with the front cover and a radially outer portion of a second plate portion to be frictionally engaged with the piston. The form of the radially outer portions is not restricted to the disk-like or circular plate-like form, and may include, e.g., an axially bent form.

The lockup device according to a third aspect of the present invention is the device of the second aspect, wherein a fifth passage included in the first passage and communicated with the third passage and a sixth passage included in the second passage and communicated with the fourth passage are formed axially between the first and second plates.

The lockup device according to a fourth aspect of the present invention is the device of the third aspect, wherein the clutch member further has an intermediate plate located between the first and second plates that ensures the fifth and sixth passages.

The lockup device according to a fifth aspect of the present invention is the device of the fourth aspect, wherein the intermediate plate has an annular body arranged radially outside the third and fourth passages, a plurality of projections aligned to each other in the rotating direction and extending radially inward from an inner peripheral portion of the body, and a plurality of recesses formed between the neighboring projections. The fifth and sixth passages are formed by the recesses and the first and second plates.

The lockup device according to a sixth aspect of the present invention is the device of the fifth aspect, wherein the plurality of recesses include a first recess corresponding to the fifth passage and a second recess corresponding to the sixth passage.

The lockup device according to a seventh aspect of the present invention is the device of the sixth aspect, wherein the first and second recesses are arranged alternately to each other in the rotating direction.

The lockup device according to an eighth aspect of the present invention is the device of any one of the fifth to seventh aspects, wherein the body has an axial projection. One of the first and second plate bodies has a concavity or a hole accommodating the projection.

The lockup device according to a ninth aspect of the present invention is the device of the second aspect, wherein the first and second plates axially contact each other. A load applied from the working fluid elastically and axially deforms at least one of the first and second plates to form a fifth passage located axially between the first and second plates, extending radially and included in the first and second passages.

The lockup device according to a tenth aspect of the present invention is the device of any one of the first to eighth aspects, wherein at least one of the first and second plates has at least one tapered surface located at its inner peripheral portion on a side forming the fifth and sixth passages.

In the description, the "tapered surface" is a surface tapered with respect to the axial direction, and is directed radially inward and toward the axial center of the clutch member. The tapered surface is not restricted to a flat surface, and may be a curved surface.

The lockup device according to an eleventh aspect of the present invention is the device of the ninth aspect, wherein at least one of the first and second plates has at least one tapered surface located at its inner peripheral portion on a side forming the fifth passage.

The lockup device according to a twelfth aspect of the present invention is the device of any one of the first to eleventh aspects, wherein the first plate has a first annular plate body and a first annular friction member fixed to the first plate body. The second plate has a second annular plate body and a second annular friction member fixed to the second plate body. The first plate body has a first hole included in the first passage. The first friction member has a second hole included in the first passage and formed in a position corresponding to the first hole. The second plate body has a third hole included in the second passage. The second friction member has a fourth hole included in the second passage and formed in a position corresponding to the third hole.

A hydraulic torque transmission device according to a thirteenth aspect of the present invention is a device that transmits a torque of an engine toward a transmission, and includes a front cover supplied with a torque, an impeller fixed to the front cover and forming a fluid chamber filled with a working fluid, a turbine opposed to the impeller, and a lockup device according to any one of the first to twelfth aspects.

In the description, the term "hydraulic torque transmission device" represents devices such as a torque converter and a fluid coupling that transmit the torque via a fluid.

EFFECT OF THE INVENTION

Owing to the above structures, the lockup device and the hydraulic torque transmission device according to the present invention can reduce the drag torque.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

(1) Overall Structure of Torque Converter

Figure 1:
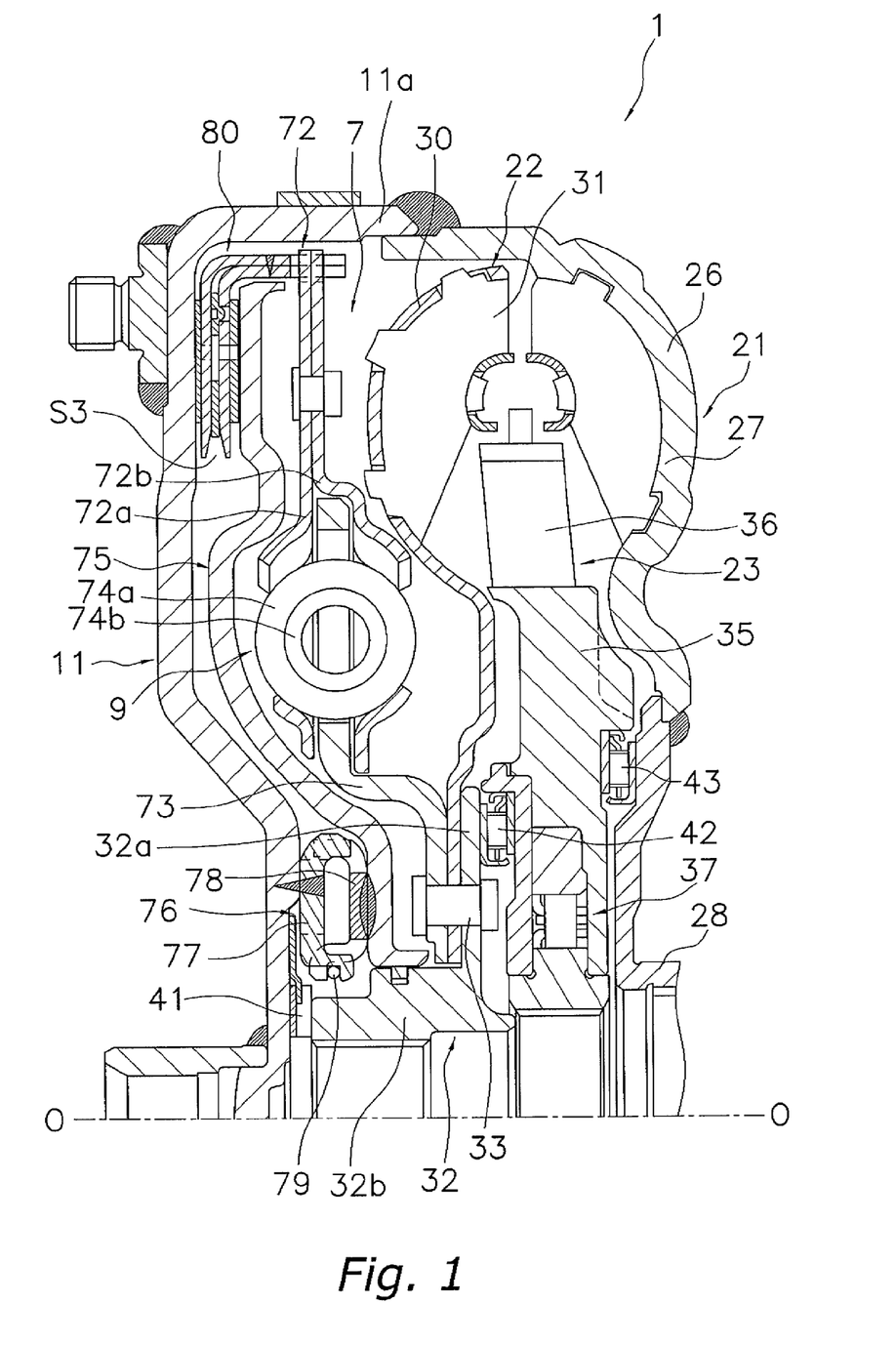
FIG. 1 is a schematic cross-sectional view of a torque converter in accordance with a first preferred embodiment of the present invention.

Referring to FIG. 1, an overall structure of a torque converter 1 according to a first embodiment will be described below with reference to FIG. 1. FIG. 1 is a schematic cross-sectional view of the torque converter 1. An engine (not shown) is arranged on the left side in FIG. 1, and a transmission (not shown) is arranged on the right side in FIG. 1. Line O-O in FIG. 1 indicates a rotation axis of the torque converter 1.

The torque converter 1 is a device that transmits a torque provided from the engine to an input shaft (not shown) of the transmission. As shown in FIG. 1, the torque converter 1 primarily includes a front cover 11 coupled to a crankshaft (not shown) of the engine, an impeller 21 cooperating with and connected to the front cover 11 to form a fluid chamber filled with a working fluid, a turbine 22 receiving the torque provided to the impeller 21 via the working fluid, a stator 23 that regulates a flow of the working fluid, and a lockup device 7 that mechanically couples the front cover 11 to the turbine 22.

The front cover 11 is provided at its outer periphery with an outer cylindrical portion 11a extending toward the transmission. An outer periphery of an impeller shell 26 of the impeller 21 is fixed, e.g., by welding to an end of the outer cylindrical portion 11a. The front cover 11 and the impeller 21 form a fluid chamber filled with the working fluid.

The impeller 21 primarily has the annular impeller shell 26, a plurality of impeller blades 27 fixed to the impeller shell 26, and an impeller hub 28 fixed by welding or the like to a radially inner portion of the impeller shell 26. The impeller shell 26 is fixed by the welding or the like to the outer cylindrical portion 11a formed at the radially outer portion of the front cover 11. The front cover 11 and the impeller 21 form a fluid chamber.

In the fluid chamber, the turbine 22 is arranged and opposed axially to the impeller 21. The turbine 22 is a member that outputs the torque toward the transmission, and is engaged via spline to an input shaft (not shown) of the transmission. The turbine 22 primarily has an annular turbine shell 30, a plurality of turbine blades 31 fixed to the turbine shell 30, and a turbine hub 32 fixed to the radially inner portion of the turbine shell 30.

The turbine hub 32 has a flange 32a and a boss 32b. The turbine shell 30 and the turbine hub 32 are fixed together with a driven plate 73 to be described later to the flange 32a of the turbine hub 32 by a plurality of rivets 33.

A stator 23 is arranged axially between the impeller 21 and the turbine 22. The stator 23 primarily has an annular stator carrier 35 and a plurality of stator blades 36 arranged on a radially outer surface of the stator carrier 35. The stator carrier 35 is carried via a one-way clutch 37 by a fixed cylindrical shaft (not shown) extending from the transmission side.

A first thrust bearing 41 is arranged axially between the front cover 11 and the boss 32b. A second thrust bearing 42 is arranged axially between the flange 32a and the stator 23. A third thrust bearing 43 is arranged axially between the stator carrier 35 and the impeller hub 28. Owing to these structures, the turbine 22 and the stator 23 that are axially positioned can rotate with respect to the front cover 11 and the impeller 21.

(2) Structure of Lockup Device

The lockup device 7 is a mechanism that mechanically couples the front cover 11 to the turbine 22 when necessary, and has a clutch function and a damper function. More specifically, as shown in FIG. 1, the lockup device 7 is arranged between the turbine 22 and the front cover 11, and primarily has a clutch plate 80, i.e., a clutch member, a damper mechanism 9, a piston 75, and a piston coupling mechanism 76.

The clutch plate 80 is a member to be frictionally engaged with the front cover 11 and the piston 75, and is arranged axially between the front cover 11 and the piston 75. The clutch plate 80 provides two friction surfaces. The clutch plate 80 is axially movably engaged with a drive plate 72 of the damper mechanism 9, and can rotate together with the drive plate 72.

The damper mechanism 9 is a mechanism that elastically couples the front cover 11 to the turbine 22 in the rotating direction, and is arranged axially between the piston 75 and the turbine 22. The damper mechanism 9 primarily has the drive plate 72 serving as an input member, the driven plate 73 serving as an output member, a plurality of first torsion springs 74a, and a plurality of second torsion springs 74b arranged inside the first torsion springs 74a.

Figure 2:
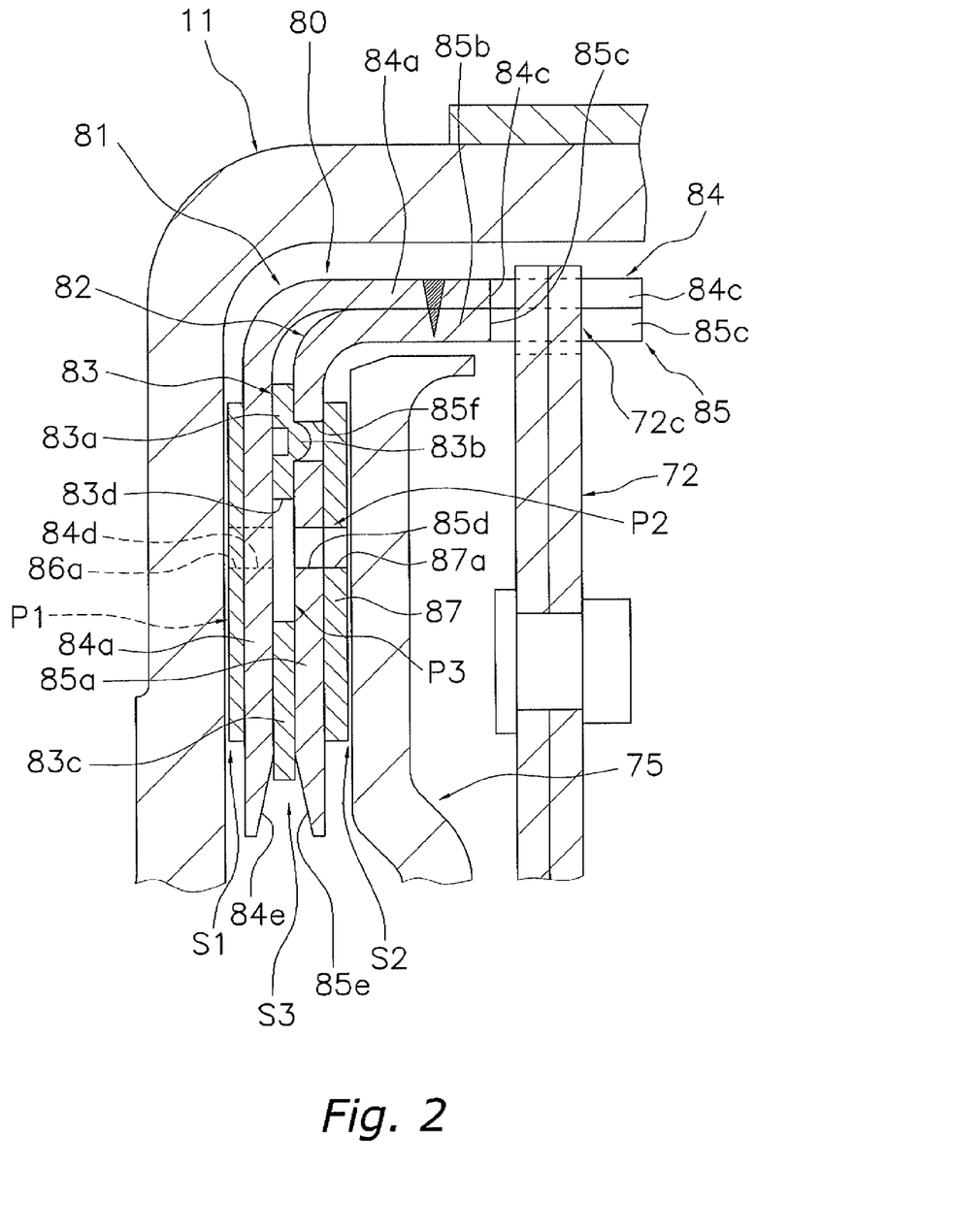
FIG. 2 is a schematic cross-sectional view of the structure of and around a clutch plate of the torque converter.

The drive plate 72 is formed of plate members 72a and 72b, and holds the first torsion springs 74a. The radially outer portion of the drive plate 72 is engaged with the clutch plate 80. More specifically, as seen in FIG. 2, the drive plate 72 is provided at its radially outer portion with a plurality of radially outward projections 72c, which are inserted into recesses 84c and 85c to be described later.

Referring again to FIG. 1, the driven plate 73 is arranged axially between the plate members 72a and 72b, and is rotatable within a certain range with respect to the drive plate 72. The radially inner portion of the driven plate 73 is fixed to the turbine hub 32 by the rivets 33. The first and second torsion springs 74a and 74b elastically couple drive and driven plates 72 and 73 together in the rotating direction.

The piston 75 is a member that achieves the clutch function, and is arranged axially between the front cover 11 and the damper mechanism 9. The piston 75 is carried rotatably and axially movably by the turbine hub 32. The piston 75 is axially movable according to the pressure of the working fluid. The piston coupling mechanism 76 is arranged between the piston 75 and the front cover 11.

The piston coupling mechanism 76 couples unrotatably and axially movably the piston 75 to the front cover 11. More specifically, as shown in FIG. 1, the piston coupling mechanism 76 primarily has a first coupling plate 77 fixed to the front cover 11, a second coupling plate 78 fixed to the piston 75, and a wire ring 79 arranged between the first and second coupling plates 77 and 78. The first coupling plate 77 is unrotatably and axially movably engaged with the second coupling plate 78. With respect to the first coupling plate 77, the second coupling plate 78 can move toward the transmission only within a certain range restricted by the wire ring 79.

(3) Structure of Clutch Plate

The lockup device 7 has a main feature in the structure of the clutch plate 80. The structure of the clutch plate 80 will be described below with reference to FIGS. 2 to 4.

Figure 3:
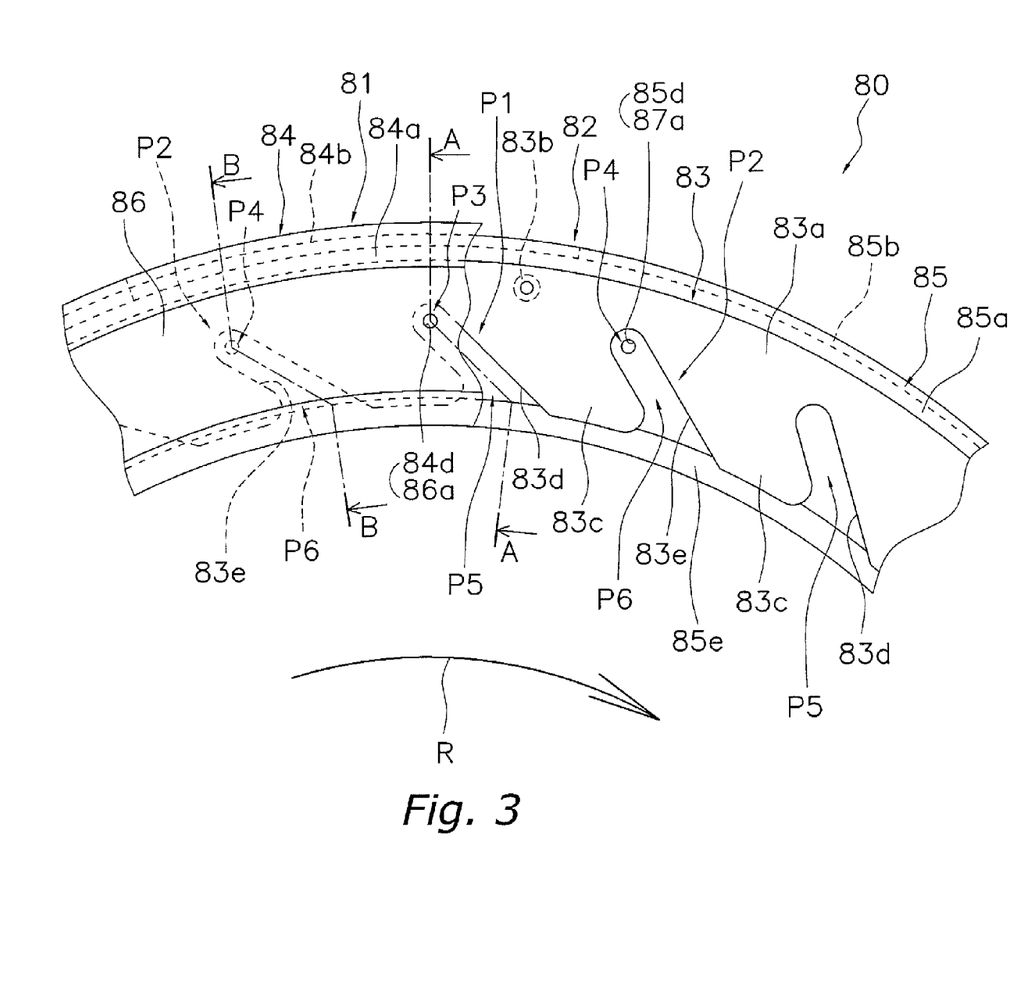
FIG. 3 is a partial schematic elevational view of a clutch plate of the torque converter.
Figure 4A:
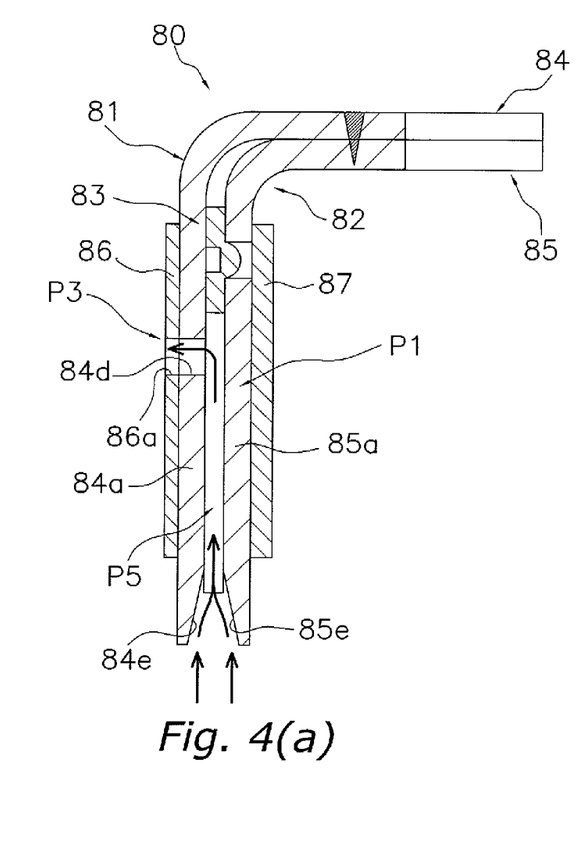
FIGS. 4(a) and 4(b) are views of cross sections taken along lines A-A and B-B in FIG. 3.
Figure 4B:
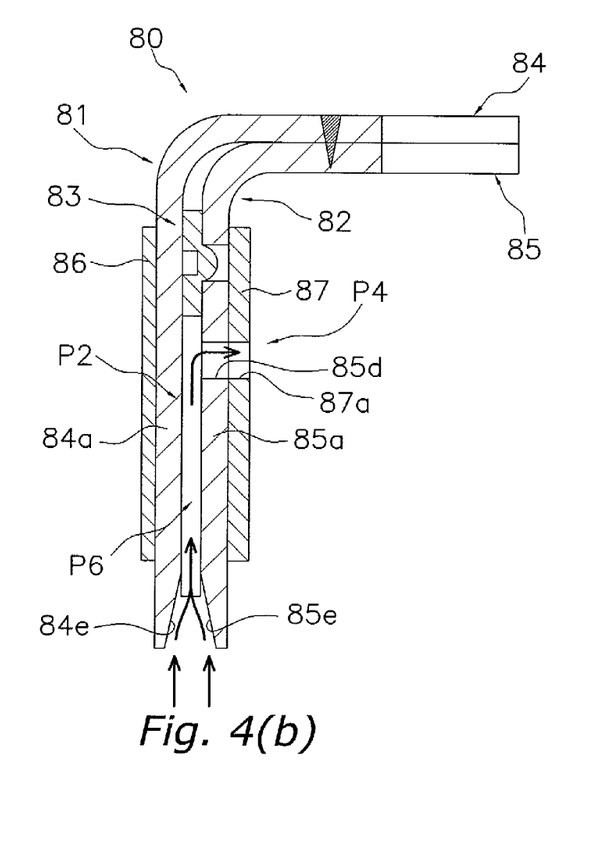

FIG. 2 is a schematic cross-sectional view of the structure of and around the clutch plate 80. FIG. 3 is a partial schematic elevational view of the clutch plate 80. FIG. 4(a) is a cross-sectional view taken along line A-A in FIG. 3. FIG. 4(b) is a cross-sectional view taken along line B-B in FIG. 3. In FIG. 3, "R" indicates the rotating direction of the front cover 11 and the piston 75.

(a) Structures of Passages

The clutch plate 80 forms the frictional coupling portion, and also forms a plurality of internal passages to reduce drag torque. More specifically, as shown in FIGS. 2 to 4, the clutch plate 80 has a first passage P1 connecting a space on the radially inner side to a space S1 formed axially between the front cover 11 and the clutch plate 80, and a second passage P2 connecting the space on the radially inner side to a space S2 formed axially between the piston and the clutch plate 80.

The first and second passages P1 and P2 pass the working fluid from the radially inner side to the spaces S1 and S2.

For achieving the first and second passages P1 and P2, the clutch plate 80 is primarily formed of a first plate 81 for frictional engagement with the front cover 11, a second plate 82 for frictional engagement with the piston 75 and an intermediate plate 83 held axially between the first and second plates 81 and 82.

The first plate 81 is provided with a third passage P3 that is included in the first passage P1 and axially extends through the first plate 81. The second plate 82 is provided with a fourth passage P4 that is included in the second passage P2 and axially extends through the second plate 82. Further, the first, second, and intermediate plates 81, 82, and 83 form a fifth passage P5 that is included in the first passage P1 and is communicated with the third passage P3 as well as a sixth passage P6 that is included in the second passage P2 and is communicated with the fourth passage P4.

As described above, the first passage P1 is formed of the third and fifth passages P3 and P5, and the second passage P2 is formed of the fourth and sixth passages P4 and P6. The first and second passages P1 and P2 are formed by the first, second, and intermediate plates 81, 82, and 83.

The various members will now be described.

(a) First Plate

The first plate 81 forms one of the two friction surfaces of the clutch plate 80, and primarily has a first plate body 84 and an annular first friction plate 86 fixed to the first plate body 84. The first plate body 84 is an integrally formed annular plate, and has a first circular plate portion 84a carrying the first friction plate 86 fixed thereto and a first cylindrical portion 84b extending from an outer periphery of the first circular plate portion 84a toward the transmission. The first circular plate portion 84a and the first friction plate 86 form a part of the frictional coupling portion.

The first cylindrical portion 84b is fixed to a second cylindrical portion 85b of a second plate body 85 to be described later by welding or the like. The first cylindrical portion 84b is provided at its end near the transmission with a plurality of circumferentially aligned recesses 84c. The projection 72c is inserted into the recess 84c.

The first plate 81 is provided with the third passage P3 included in the first passage P1. More specifically, as shown in FIGS. 2 and 3, the first plate body 84 is provided with a plurality of first holes 84d arranged with a uniform pitch in the rotating direction. The first friction plate 86 is provided with a plurality of second holes 86a that are arranged with a uniform pitch in the rotating direction. The first holes 84d are arranged in the positions corresponding to the second holes 86a, respectively. The first and second holes 84d and 86a form the third passage P3.

The first plate body 84 is provided at a radially inner portion with a first tapered surface 84e directed radially inward and toward the transmission (i.e., the axial center of the clutch plate 80). In other words, the first tapered surface 84e faces toward a transmission side and preferably tapers away from the transmission side in a radially inward direction. Thus, the radially inner portion of the first plate body 84 has a thickness that gradually decreases as the position moves radially inward.

(b) Second Plate

The second plate 82 is arranged on the transmission side with respect to the first plate 81, and forms the other of the two friction surfaces of the clutch plate 80. The second plate 82 primarily has the second plate body 85 and an annular second friction plate 87 fixed to the second plate body 85. The second plate body 85 is an integrally formed annular plate, and has a second circular plate portion 85a carrying the second friction plate 87 fixed thereto, and the second cylindrical portion 85b extending from the outer periphery of the second circular plate portion 85a toward the transmission. The second circular plate portion 85a and the second friction plate 87 form a part of the frictional coupling portion.

The second cylindrical portion 85b is arranged radially inside the first cylindrical portion 84b and is in radial contact with the first cylindrical portion 84b. The second cylindrical portion 85b is fixed by welding or the like to the first cylindrical portion 84b of the first plate body 84. The second cylindrical portion 85b is provided at its end near the transmission with the circumferentially aligned recesses 85c. The recesses 85c are arranged in the positions corresponding to the recesses 84c formed at the first cylindrical portion 84b, respectively. Each projection 72c is inserted into the recesses 84c and 85c.

The second plate 82 is provided with the fourth passage P4 included in the second passage P2. More specifically, as shown in FIGS. 2 and 3, the second plate body 85 is provided with a plurality of third holes 85d arranged with a uniform pitch in the rotating direction. The second friction plate 87 is provided with a plurality of fourth holes 87a arranged with a uniform pit in the rotating direction. The third holes 85d are arranged in the positions corresponding to the fourth holes 87a, respectively. The third and fourth holes 85d and 87a form the fourth passage P4.

The second plate body 85 is provided at is radially inner portion with a second tapered surface 85e directed radially inward and toward the engine. In other words, the second tapered surface 85e faces toward an engine side and tapers away from the engine side in a radially inward direction. Thus, the radially inner portion of the second plate body 85 has a thickness that gradually decreases as the position moves radially inward.

As shown in FIG. 3, the radial position of the fourth passage P4 (third and fourth holes 85d and 87a) matches with the radial position of the third passage P3 (first and second holes 84d and 86a). When viewed axially, the fourth passage P4 is arranged circumferentially between the third passages P3 neighboring to each other. In this embodiment, the third passages P3 are equal in number to the fourth passages P4.

(c) Intermediate Plate

The intermediate plate 83 ensures the fifth and sixth passages P5 and P6, and is held axially between the first and second plates 81 and 82. More specifically, as shown in FIGS. 2 and 3, the intermediate plate 83 primarily has an annular body 83a, and a plurality of projected portions 83c substantially extending radially inward from the inner periphery of the body 83a.

The body 83a is arranged radially outside the third and fourth passages P3 and P4. The plurality of projected portions 83c is arranged with a uniform pitch in the rotating direction. The projected portions 83c extend in a radially inward direction inclined in the direction R. Thus, the projected portion 83c is inclined in the rotating direction with respect to the radial direction.

A plurality of first and second recesses 83d and 83e extending radially outward are formed between the neighboring projected portions 83c. The first recesses 83d are arranged with a uniform pitch in the rotating direction. The second recesses 83e are arranged with a uniform pitch in the rotating direction, and each are arranged between the neighboring first recesses 83d. Thus, the first and second recesses 83d and 83e are arranged alternately to each other in the rotating direction. The second recess 83e has the same form as the first recess 83d. The first and second recesses 83d and 83e are inclined in the rotating direction with respect to the radial direction. The first and second recesses 83d and 83e ensure the plurality of fifth and sixth passages P5 and P6 between the first and second plates 81 and 82.

The body 83a is provided with a plurality of projections 83b. The projections 83b extend toward the transmission, and are engaged with engagement holes 85f formed at the second circular plate portion 85a of the second plate 82, respectively. This structure can position the intermediate plate 83 with respect to the first and second plates 81 and 82.

The third passage P3 is located in the circumferential position substantially matching with the radially outer portion of the first recess 83d, and is communicated with only the fifth passage P5. The fourth passage P4 is located in the circumferential position matching with the radially outer portion of the second recess 83e, and is communicated with only the sixth passage P6.

The above structures achieve the first passage P1 formed of the third and fifth passages P3 and P5 as well as the second passage P2 formed of the fourth and sixth passages P4 and P6.

(4) Operation of Torque Converter

An operation of the torque converter 1 will be described below with reference to FIGS. 1 to 4.

When the lockup device 7 is to be coupled, the working fluid between the piston 75 and the turbine 22 is discharged. Consequently, the hydraulic pressure applied to the piston 75 from the turbine 22 side exceeds the hydraulic pressure applied from the front cover 11 side, and the piston 75 moves toward the front cover 11. Thereby, the clutch plate 80 is held between the piston 75 and the front cover 11. The torque provided to the front cover 11 is transmitted to the turbine 22 via the clutch plate 80 and the damper mechanism 9.

When the lockup device 7 is to be disengaged, a hydraulic pump (not shown) supplies the working fluid to a space between the piston 75 and the front cover 11. Consequently, the hydraulic pressure applied to the piston 75 from the front cover 11 side increases to move the piston 75 toward the turbine 22. Thereby, the clutch plate 80 is disengaged, and the clutch plate 80 becomes rotatable with respect to the front cover 11 and the piston 75.

The flow of the working fluid in the disengaged state will be described below. In the disengaged state, the spaces formed by the movement of the piston 75 are present between the clutch plate 80 and the front cover 11 as well as between the clutch plate 80 and the piston 75, respectively. The working fluid supplied by the hydraulic pump into a space between the piston 75 and the front cover 11 from a radially inner side flows radially outward owing to the pressure applied by the hydraulic pump and a centrifugal force. A major portion of the working fluid thus supplied is guided by the first and second tapered surfaces 84e and 85e into the first and second passages P1 and P2. More specifically, the working fluid flows into the plurality of fifth and sixth passages P5 and P6 that are located alternately in the rotating direction. The working fluid that flowed into the fifth passage P5 is led through the third passage P3 into the space S1 between the front cover 11 and the clutch plate 80. The working fluid that flowed into the sixth passage P6 is led through the fourth passage P4 into the space S2 between the piston 75 and the clutch plate 80.

As described above, the majority of the working fluid supplied during the disengaged state is led to the spaces S1 and S2 through the first and second passages P1 and P2. In this operation, the working fluid flowing through the third passage P3 axially impinges on the front cover 11, and the working fluid passed through the fourth passage P4 axially impinges on the piston 75. Consequently, a load is applied to the clutch plate 80 to move the clutch plate 80 away from the front cover 11 and the piston 75. This suppresses a state in which the clutch plate 80 is pulled toward the front cover 11 or the piston 75, and reduces the drag torque.

(6) Operation and Effect (a) As described above, the lockup device 7 includes the first and second passages P1 and P2 formed inside the clutch plate 80, and the working fluid radially inside the clutch plate 80 is led into the space S1 between the front cover 11 and the clutch plate 80 as well as the space S2 between the piston 75 and the clutch plate 80. This suppresses a state in which the clutch plate 80 is pulled toward the front cover 11 or the piston 75, and reduces the drag torque.

(b) In this lockup device 7, the clutch plate 80 is formed of the first, second, and intermediate plates 81, 82 and 83. Therefore, the first and second passages P1 and P2 can be realized by a simple structure.

(c) In this lockup device 7, the first and second passages P1 and P2 are arranged alternately to each other in the rotating direction with a uniform pitch. Therefore, the amount of working fluid flowing into the first passage P1 is substantially equal to that of the working fluid flowing into the second passage P2 so that the behavior of the clutch plate 80 can be stable.

(d) In this lockup device 7, the fifth and sixth passages P5 and P6 are inclined with respect to the radial direction. Therefore, the working fluid can easily enter the fifth and sixth passages P5 and P6 so that the drag torque is further reduced.

(e) In this lockup device 7, the clutch plate 80 is provided at its radially inner portion with the first and second tapered surfaces 84e and 85e. This structure widens the inlets of the fifth and sixth passages P5 and P6 so that the working fluid can enter the fifth and sixth passages P5 and P6 more easily. This promotes the reduction in drag torque.

(f) Owing to the above features, the torque converter 1 can reduce the drag torque in the lockup device 7. Therefore, the performance of the torque converter 1 increases, which contributes to improvement of the fuel consumption of the vehicle.

Alternate Embodiments

Alternate embodiments will now be explained. In view of the similarity between the first and alternate embodiments, the parts of the alternate embodiment that are identical to the parts of the first embodiment will be given the same reference numerals as the parts of the first embodiment. Moreover, the descriptions of the parts of the alternate embodiments that are identical to the parts of the first embodiment may be omitted for the sake of brevity. The specific structures of the invention are not restricted to the foregoing embodiments, and various variations and modifications can be performed without departing from the substance of the invention.

(1) In the embodiment already described, the intermediate plate 83 is arranged between the first and second plates 81 and 82. However, the intermediate plate 83 may be eliminated.

Figure 5:
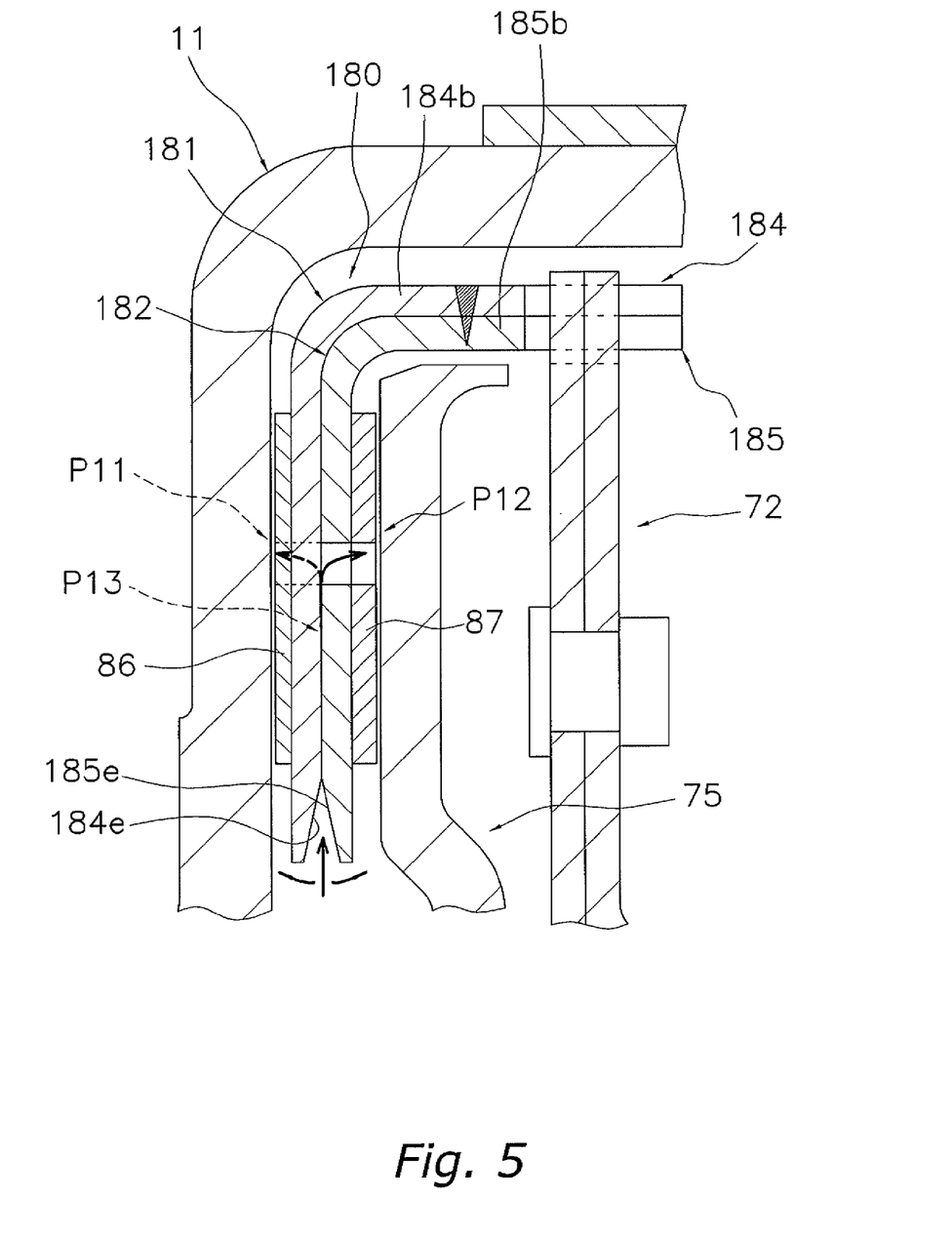
FIG. 5 is a schematic cross-sectional view of the structure of and around a clutch plate of a torque converter in accordance with an alternate preferred embodiment of the present invention.
Figure 6:
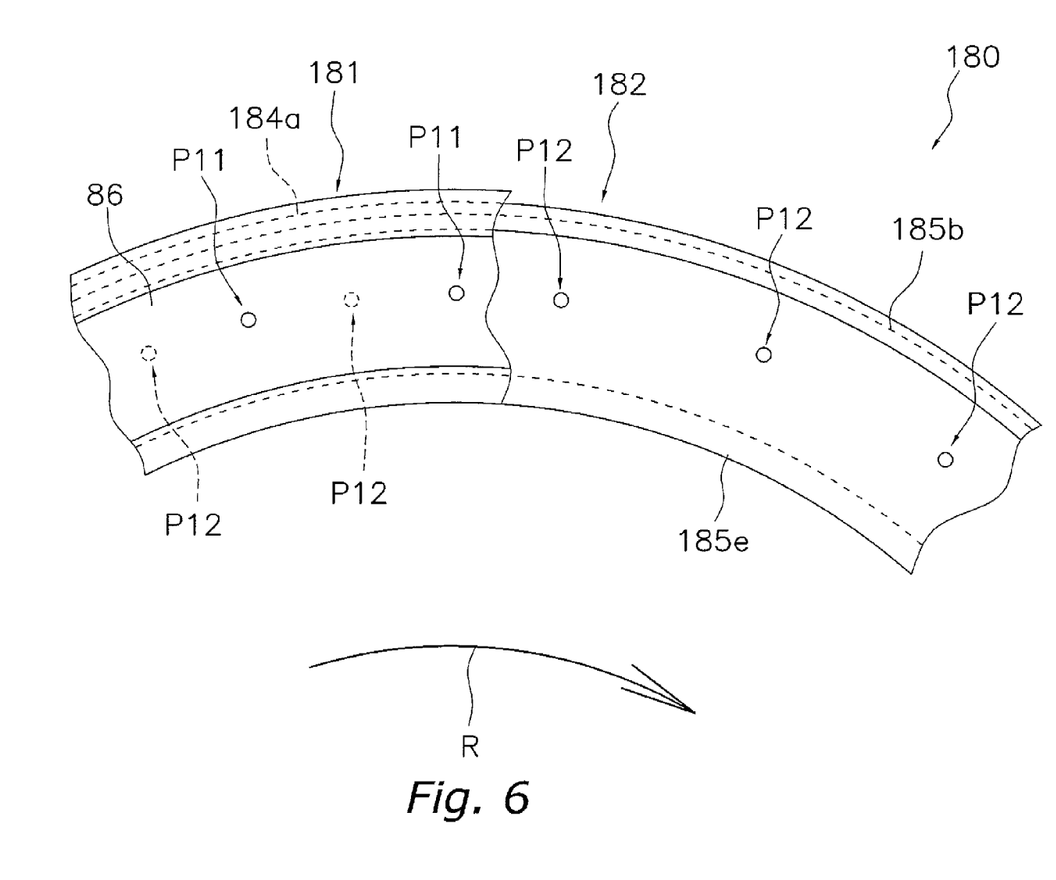
FIG. 6 is a partial schematic elevational view of the clutch plate of the alternate preferred embodiment.

More specifically, a clutch plate 180 shown in FIGS. 5 and 6 may be employed. In this case, no member is present between the first and second plates 181 and 182, and the first and second plates 181 and 182 are axially in contact with each other. The first and second plates 181 and 182 have first and second cylindrical portions 184b and 185b, respectively, which are respectively fixed similarly to the foregoing embodiment. Similarly to the foregoing embodiment, the first plate 181 is provided with a plurality of first passages P11, and the second plate 182 is provided with a plurality of second passages P12. The first and second plates 181 and 182 are respectively provided with first and second tapered surfaces 184e and 185e.

In the disengaged state of the this structure, when the working fluid flows radially outward from the radially inner side of the clutch plate 180, a part of the working fluid tends to flow along the first and second tapered surfaces 184e and 185e into a space between the first and second plates 181 and 182. Consequently, the first and second plates 181 and 182 receiving the load from the working fluid deform slightly and elastically in the axial direction to form an annular passage P13 extending in the radial direction. This leads the working fluid into the first and second passages P11 and P12 so that the drag torque is reduced.

(2) In the foregoing embodiment, the first and second passages P1 and P2 are independent of each other. However, the first and second passages P1 and P2 may partially share a passage. For example, such a structure may be considered as an embodiment that the third and fourth passages P3 and P4 are located in the same circumferential position, and are communicated with one passage, i.e., the fifth passage P5. In this case, first and second passages P1 and P2 share the fifth passage P5. This may cause a state in which the working fluid led to the space S1 is different in amount from that led to the second space S2, but can reduce the drag torque.

(3) In the foregoing embodiment, the clutch plate 80 is formed of a plurality of members. However, some of these members may be replaced with (an) integral member(s). For example, the first, second, and intermediate plates 84, 85, and 83 may be formed of one integral member provided that the first and second passages P1 and P2 are internally formed. Also, the first plate body 84 and the intermediate plate 83 may be formed integrally with each other.

(4) In the foregoing embodiment, the clutch plate 80 includes the intermediate plate 83 that ensures the fifth and sixth passages P5 and P6. However, the intermediate plate 83 may be replaced with a plurality of projections formed, e.g., on the first plate body 84. In this structure, the projections are in contact with the second plate body 85 so that an annular passage is formed axially between the first and second plates 81 and 82.

(5) In the foregoing embodiment, the first cylindrical portion 84b of the first plate 81 is fixed to the second cylindrical portion 85b of the second plate 82, but may be fixed to another portion. It is merely required that the radially outer portion of the clutch plate 80 is fixed. For example, the first and second cylindrical portions 84b and 85b may be eliminated, and the radially outer portion of the first circular plate portion 84a may be fixed to the radially outer portion of the second circular plate portion 85a.

(6) In the foregoing embodiment, the first and second tapered surfaces 84e and 85e are flat. However, these tapered surfaces may be curved, provided that the tapered surfaces enlarge the inlets of the fifth and sixth passages P5 and P6.

(7) In the foregoing embodiment, the projections 83b are formed on the body 83a of the intermediate plate 83, and the engagement holes 85f are formed in the second plate body 85. However, the projections may be formed on the second plate body 85, and the engagement holes may be formed in the intermediate plate 83. Also, the engagement holes may be formed in the first plate body 84. Further, the engagement holes may be concavities that are axially hollowed, provided that the intermediate plate 83 can be positioned.

(8) In the foregoing embodiment, the torque converter 1 has been described as an example of the hydraulic torque transmission device. However, the device employing the lockup device 7 is not restricted to it. For example, the lockup device 7 may be employed in a fluid coupling.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a torque converter equipped with the present invention. Accordingly, these terms, as utilized to describe the present invention should be interpreted relative to a torque converter equipped with the present invention as normally used. Moreover, terms that are expressed as "means-plus function" in the claims should include any structure that can be utilized to carry out the function of that part of the present invention. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A lockup device for a hydraulic torque transmission device having a front cover supplied with a torque, an impeller fixed to the front cover and forming a fluid chamber filled with a working fluid, and a turbine opposed to the impeller, the lockup device being arranged in a space between the front cover and the turbine to couple mechanically the front cover to the turbine, the lockup device comprising:
   a piston arranged rotatably and axially movably with respect to the turbine and being axially movable according to a pressure of the working fluid;
   a clutch member having a frictional coupling portion arranged axially between the piston and the front cover for frictional engagement with the piston and the front cover; and
   a damper mechanism elastically coupling the clutch member and the turbine together in a rotating direction,
   the clutch member having an annular first plate configured to engage frictionally with the front cover, and an annular second plate arranged between the first plate and the piston and configured to engage frictionally with the piston, the first and second plates being arranged to allow the working fluid to flow between the first and second plates from a radially inner side of the first and second plates, radially outer portions of the first and second plates being fixed to each other, when the lockup device is disengaged, a first passage through which the working fluid flows from the radially inner side of the first and second plates to a space formed axially between the front cover and the frictional coupling portion is formed between the first and second plates and a second passage through which the working fluid flows from the radially inner side of the first and second plates to a space formed axially between the piston and the frictional coupling portion is formed between the first and second plates.

2. The lockup device according to claim 1, wherein
the first plate has a plurality of third passages extending axially and included in the first passage, and
the second plate has a plurality of fourth passages extending axially and included in the second passage.

3. The lockup device according to claim 2, wherein
a fifth passage included in the first passage and communicated with the third passage and a sixth passage included in the second passage and communicated with the fourth passage are formed axially between the first and second plates.

4. The lockup device according to claim 3, wherein
the clutch member further has an intermediate plate located between the first and second plates to ensure the fifth and sixth passages.

5. The lockup device according to claim 4, wherein
the intermediate plate has an annular body arranged radially outside the third and fourth passages, a plurality of projections aligned to each other in the rotating direction and extending radially inward from an inner peripheral portion of the body, and a plurality of recesses formed between the neighboring projections, and
the fifth and sixth passages are formed by the recesses and the first and second plates.

6. The lockup device according to claim 5, wherein
the plurality of recesses includes a first recess corresponding to the fifth passage and a second recess corresponding to the sixth passage.

7. The lockup device according to claim 6, wherein
the first and second recesses are arranged alternately to each other in the rotating direction.

8. The lockup device according to claim 7, wherein
the body has an axial projection, and
one of the first and second plate bodies has a concavity or a hole accommodating the projection.

9. The lockup device according to claim 8, wherein
at least one of the first and second plates has at least one tapered surface located at its inner peripheral portion on a side forming the fifth and sixth passages.

10. The lockup device according to claim 5, wherein
the body has an axial projection, and
one of the first and second plate bodies has a concavity or a hole accommodating the projection.

11. The lockup device according to claim 3, wherein
the first and second plates are axially in contact with each other, and
a load applied from the working fluid elastically and axially deforms at least one of the first and second plates to form the fifth passage located axially between the first and second plates, extending radially and included in the first and second passages.

12. The lockup device according to claim 11, wherein
at least one of the first and second plates has at least one tapered surface located at its inner peripheral portion on a side forming the fifth passage.

13. The lockup device according to claim 12, wherein
the first plate has a first annular plate body and a first annular friction member fixed to the first plate body,
the second plate has a second annular plate body and a second annular friction member fixed to the second plate body,
the first plate body has a first hole included in the first passage,
the first friction member has a second hole included in the first passage and formed in a position corresponding to the first hole,
the second plate body has a third hole included in the second passage, and
the second friction member has a fourth hole included in the second passage and formed in a position corresponding to the third hole.

14. The lockup device according to claim 3, wherein
at least one of the first and second plates has at least one tapered surface located at its inner peripheral portion on a side forming the fifth and sixth passages.

15. The lockup device according to claim 14, wherein
the first plate has a first annular plate body and a first annular friction member fixed to the first plate body,
the second plate has a second annular plate body and a second annular friction member fixed to the second plate body,
the first plate body has a first hole included in the first passage,
the first friction member has a second hole included in the first passage and formed in a position corresponding to the first hole,
the second plate body has a third hole included in the second passage, and
the second friction member has a fourth hole included in the second passage and formed in a position corresponding to the third hole.

16. The lockup device according to claim 2, wherein
the first plate has a first annular plate body and a first annular friction member fixed to the first plate body,
the second plate has a second annular plate body and a second annular friction member fixed to the second plate body,
the first plate body has a first hole included in the first passage,
the first friction member has a second hole included in the first passage and formed in a position corresponding to the first hole,
the second plate body has a third hole included in the second passage, and
the second friction member has a fourth hole included in the second passage and formed in a position corresponding to the third hole.

17. The lockup device according to claim 1, wherein
the frictional coupling portion includes a first frictional coupling portion that contacts the front cover and a second frictional coupling portion that contacts the piston, and
the first passage connects the space on the radially inside to a space between the front cover and the first frictional coupling portion, and the second passage connects the space the space on the radially inside to a space between the second frictional coupling portion and the piston.

18. A hydraulic torque transmission device for transmitting a torque of an engine toward a transmission, comprising:
- a front cover supplied with a torque;
- an impeller fixed to the front cover and forming a fluid chamber filled with a working fluid;
- a turbine opposed to the impeller; and
- a lockup device being arranged between axially between the front cover and the turbine to couple mechanically the front cover to the turbine, the lockup device including
  - a piston arranged rotatably and axially movably with respect to the turbine and being axially movable according to a pressure of the working fluid,
  - a clutch member having a frictional coupling portion arranged axially between the piston and the front cover for frictional engagement with the piston and the front cover, and
  - a damper mechanism elastically coupling the clutch member and the turbine together in a rotating direction,
- the clutch member having an annular first plate configured to engage frictionally with the front cover, and an annular second plate arranged between the first plate and the piston and configured to engage frictionally with the piston,
- the first and second plates being arranged to allow the working fluid to flow between the first and second plates from a radially inner side of the first and second plates,
- radially outer portions of the first and second plates being fixed to each other,
- when the lockup device is disengaged, a first passage through which the working fluid flows from the radially inner side of the first and second plates to a space formed axially between the front cover and the frictional coupling portion is formed between the first and second plates and a second passage through which the working fluid flows from the radially inner side of the first and second plates to a space formed axially between the piston and the frictional coupling portion is formed between the first and second plates.

19. The hydraulic torque transmission device according to claim 18, wherein
- the first plate has a plurality of third passages extending axially and included in the first passage,
- the second plate has a plurality of fourth passages extending axially and included in the second passage,
- a fifth passage included in the first passage and communicated with the third passage and a sixth passage included in the second passage and communicated with the fourth passage are formed axially between the first and second plates,
- at least one of the first and second plates has at least one tapered surface located at its inner peripheral portion on a side forming the fifth and sixth passages.

20. The hydraulic torque transmission device according to claim 19, wherein
- the first and second plates are axially in contact with each other, and
- a load applied from the working fluid elastically and axially deforms at least one of the first and second plates to form a fifth passage located axially between the first and second plates, extending radially and included in the first and second passages.

* * * * *